J. E. BURTON.
DRAG ATTACHMENT FOR PLOWS.
APPLICATION FILED JAN. 20, 1908. RENEWED MAR. 8, 1909.
935,738.
Patented Oct. 5, 1909.
3 SHEETS—SHEET 3.
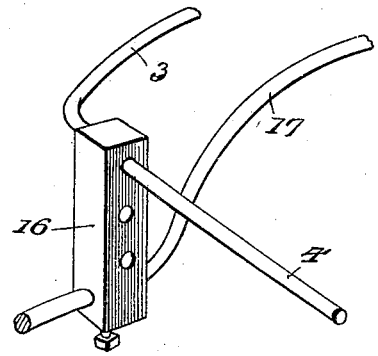
Fig. 7.
Fig. 6.
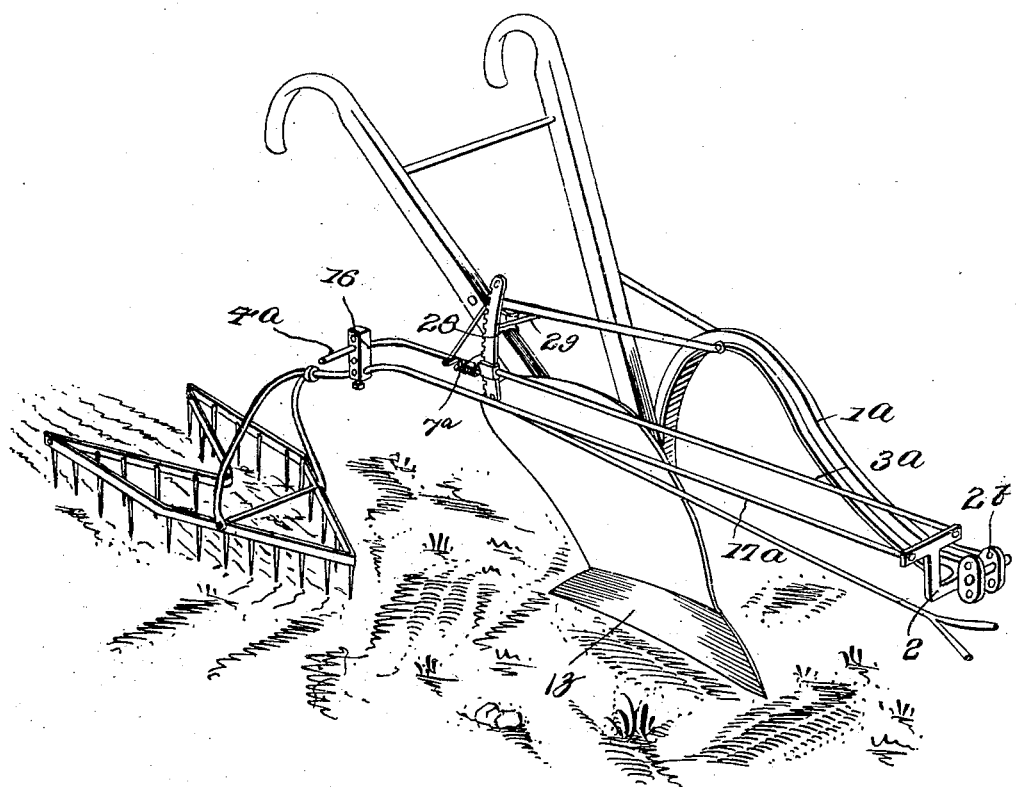
Witnesses
Inventor
James E. Burton
By Rh a R Lacey, Attorneys

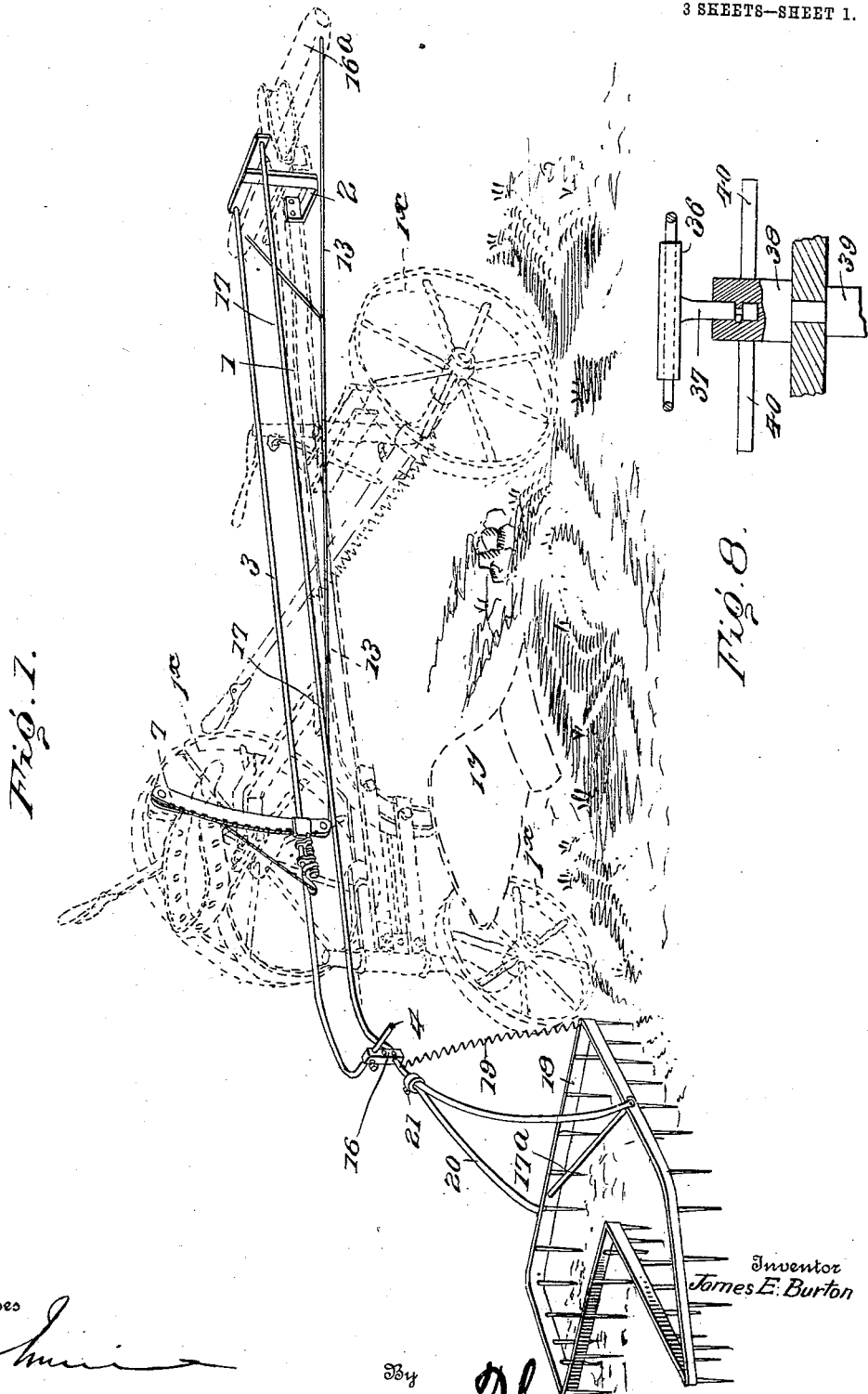

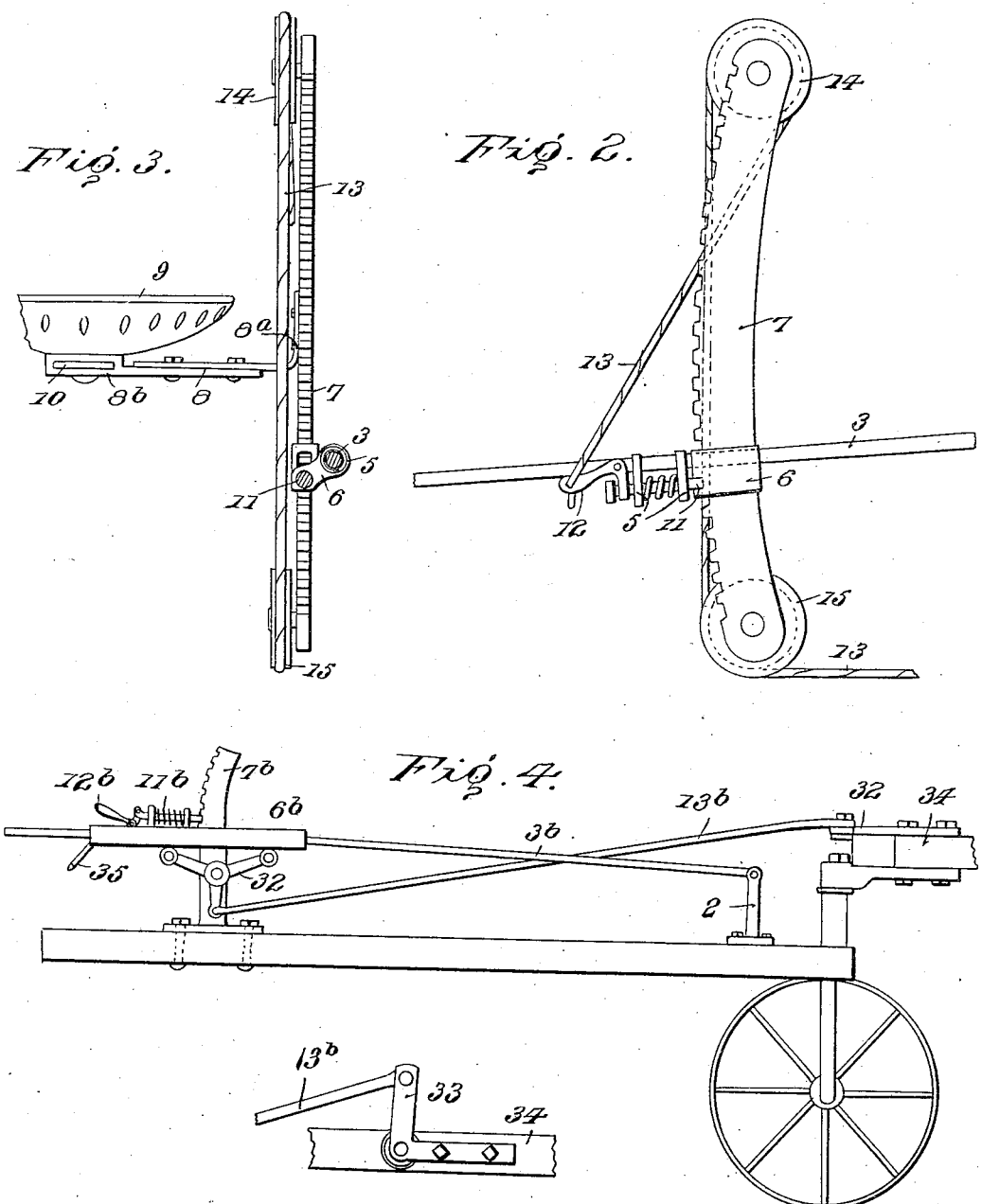

UNITED STATES PATENT OFFICE.

JAMES E. BURTON, OF WHITEWATER, WISCONSIN.

DRAG ATTACHMENT FOR PLOWS.

935,738.  Specification of Letters Patent.  Patented Oct. 5, 1909.

Application filed January 20, 1908, Serial No. 411,743.  Renewed March 8, 1909. Serial No. 482,171.

*To all whom it may concern:*

Be it known that I, JAMES E. BURTON, citizen of the United States, residing at Whitewater, in the county of Walworth and State of Wisconsin, have invented certain new and useful Improvements in Drag Attachments for Plows, of which the following is a specification.

This invention has for its primary object a novel and efficient construction of side drag attachment for plows, whereby when the soil is first turned and exposed to the sun and air, it may be smoothed, or otherwise treated, before the clods shall have had time to harden and the moisture absorbed, the soil being treated at a time when it is the more easily pulverized and the work being completed without the mark of a horse's hoof on the surface of the ground.

A further object of the invention is a device of this character which embodies as an entirety an attachment that may be raised or lowered so that it may be operated at the desired depth or elevation, and that will be automatically raised out of lowered operative position when the plow turns a corner. And a still further object of the invention is a drag attachment of this character which may be laterally adjusted relative to the plow with which it is incorporated, so that the desired furrows may be harrowed, or otherwise treated, and rendering the device capable of use with plows turning one, two, or more furrows simultaneously.

With these and other objects in view as will more fully appear as the description proceeds, the invention consists in certain constructions, arrangements and combinations of the parts that I shall hereinafter fully describe and then claim.

For a full understanding of the invention, reference is to be had to the following description and accompanying drawings, in which:

Figure 1 is a perspective view of a riding or sulky plow provided with the improvements of my invention, the plow itself being shown in dotted lines. Fig. 2 is a detail side elevation on an enlarged scale of one embodiment of the means employed to automatically raise and lower the side attachment when the plow is turned to the right or to the left; Fig. 3 is a rear edge view of the raising mechanism illustrated in Fig. 2; Fig. 4 is a side elevation of a portion of the riding plow, illustrating a modification of the drag implement raising means; Fig. 5 is a detail top plan view of a portion of the mechanism illustrated in Fig. 4; Fig. 6 is a perspective view illustrating the invention as applied to a walking plow; Fig. 7 is a detail perspective view of the coupling member employed to adjustably connect together the two sections or rods of the supporting lever; and, Fig. 8 is a detail view illustrating another form of mounting for the forward end of the drag supporting lever.

Corresponding and like parts are referred to in the following description and indicated in all the views of the drawings by the same reference characters.

In that form of the invention illustrated in Fig. 1, my improved side attachment is shown as applied to a sulky or riding plow of any of the ordinary types, 1 designating the beam or standard of the plow framework $1^x$ designates the supporting or furrow wheels of the plow and $1^y$ the share thereof. A post 2 is secured to the front end of the beam 1 in any desired manner and projects laterally and upwardly therefrom, and a rod-like lever 3 is fulcrumed at its forward end on the said post 2 and extends rearwardly alongside of the plow frame, preferably to the rear thereof, the rear end of said lever being bent outwardly, as indicated at 4. Between its ends, the said lever 3 passes freely through collars 5 that are formed on the rear extension of a sleeve 6. This sleeve encircles and is mounted to slide up and down upon a curved rack 7 which is adjustably secured, so far as vertical position is concerned, on the upwardly projecting angular end $8^a$ of a two-part or sectional brace 8, the said brace projecting laterally from underneath the driver's seat 9, and being formed at one end with a loop $8^b$ adapted to slip over the seat spring 10, being secured thereto by bolts or any desired fastening devices. A spring pressed latch 11 is mounted upon the rear extension of the sleeve 6 and is designed for engagement with any of the teeth of the rack 7, so as to hold the rear end of the lever 3 at the desired elevation. This latch is provided with a manually operable hand lever 12 by which the latch is designed to be released. In one embodiment of the invention, a wire cord or cable 13 is secured at one end to the hand lever 12, said cable extending over a pulley 14 supported on the upper end of the rack 7 and thence extending downwardly and around another pulley 15 journaled in the lower end of said rack. This cable 13 extends forwardly and is so connected to the evener 16ª that when the latter is turned to the right or to the left when a plow turns a curve, a forward pull will be exerted upon the cable 13 and this will manifestly first pull upwardly upon the hand lever 12 and cause it to release the latch 11 from the rack 7, a continued pull upon the cable 13, then effecting the upward sliding movement of the sleeve 6 on the rack bar 7 to consequently raise the rear end of the lever 3.

As has been above stated, the rear end of the lever 3 is extended outwardly as indicated at 4. This lateral extension of the lever passes through any one of a series of laterally and horizontally disposed openings in a coupling member 16, and the coupling member is held at the desired lateral adjustment on the extension 4 by means of a set screw extending through the coupling member and impinging against the said extension as clearly illustrated in the drawing. A rod 17 is also connected to the coupling member 16 and passes through a forwardly and backwardly extending opening formed in the lower end of the coupling member, the coupling member being held at the required adjustment on the rod 17 by a set screw working in the lower end of the coupling member and impinging against the said rod. This rod 17 coacts with the lever 3 and both of said rods connected constitute a support for a drag attachment, the said rods having spring characteristics so that the drag attachment supported thereby may yield upwardly when any obstruction is met with. The forward end of the rod-like lever 17 is fulcrumed on the supporting post 2, and the rear end of said rod back of the coupling member 16 is curved rearwardly, outwardly, downwardly, forwardly, and thence laterally toward the plow, the last named portion or extremity being designated 17ª and constituting a rest for the front drag implement 18 which, in the present instance is shown as a toothed harrow of triangular shape, although it is to be understood that a spade or disk harrow, or roller, smoother, or pulverizer of any desired construction may be substituted therefor, within the scope of my invention. In the present instance, the front end of the harrow 18 is yieldingly connected to the rod 17 and the frame-like lever by means of a spring 19. The harrow 18 or any other desired implement, as the case may be, is laterally extended by means of a detachable brace 20, which is shaped to correspond to the curved rear portion of the rod 17 and which is secured at one end to the section 17ª and also secured at its other end to the rod 17, just in the rear of the coupling member 16 by a clamp 21.

From the foregoing description in connection with the accompanying drawings, it will be evident that a plow equipped with the improvements of my invention may travel over the fields and pulverize or otherwise treat the soil. The drag implement or implements as the case may be, are dragged along by the support constituted by the lever 3 and rod 17, and it is evident that the drag implements may be held at the desired depth or elevation by the engagement of the latch 11 with the requisite teeth of the rack bar 7, the operator on the seat 9 effecting this adjustment readily by grasping the hand lever 12 and the lever 3, and pressing the hand lever toward the lever and then raising the latter. Whenever the plow turns a corner, it is obvious from the foregoing that the cable 13 will be pulled forwardly and this will automatically effect the release of the latch 11 from the teeth of the rack bar 7 and then instantly raise sleeve 6 upon the rack bar so as to carry the lever 3 and rod 17 upwardly and hold the drag implements suspended out of the ground until the corner has been turned, and the machine is ready for another operation. It will also be understood that the entire drag attachment may be held in the relative inoperative position when traveling along the road by the proper adjustment of the parts of the invention and the latch 11 with the teeth near the upper end of the rack bar 7.

As the coupling member 16 is laterally adjustable, on the outwardly extending rear end 4 of the lever 3 and longitudinally adjustable on the rear end of the rack 7, it is clear that the drag implement or implements may be adjusted laterally and held at the required distance to one side of the plow according to the particular furrow that the operator desires to treat, this being an important feature and rendering the attachment capable of use with a single or a gang plow.

It is to be understood that my invention is not limited to use with or embodiment in plows of the riding or sulky type. It is equally applicable to walking plows. For instance, as an illustration of this, reference is to be had to Fig. 6 wherein 1ª designates the beam of a walking plow, 2ᵇ the clevis thereof, 1ᶻ the share, 3ª and 17ª the two rods of the frame-like drag implement support, which, in the present instance is fulcrumed in the clevis 2ᵇ. 7ª is the rack bar which is secured by clamps 28 and transverse brace 29 to the handles 30 of the plow and which is operatively connected to the rod 3ª as above described in connection with a sulky plow embodying the invention. In other respects this embodiment of the invention is like that above described, the 13ᶜ changes necessary to adapt the device either to a sulky or walking plow being within the scope of the ordinary agriculturist requiring no special skill in regard to mechanics. At the same time, I have illustrated the invention as adapted to both forms of plows, in order to show its range of usefulness and its simplicity of construction.

Fig. 4 illustrates a modified form of the automatic raising and lowering means for the drag implements when the plow turns a corner. In this view, it will be seen that the rod $3^b$ is supported by a sleeve $6^b$ mounted to slide up and down on the rack $7^b$ with which a latch $11^b$ is designed for engagement. A V-shaped lever 32 is fulcrumed intermediate the rack bar $7^b$ and so engages the sleeve $6^b$ that when the lower arm of the lever 32 is moved forwardly, or rearwardly the sleeve $6^b$ will be raised. This lower arm of the lever is connected by a rod $13^b$ to an angular bracket 33 secured to and projecting rearwardly and laterally from the pole 34 so that as the pole is turned to the right or to the left, in order to guide the plow in one direction or the other, the lever 32 will be rocked, and the sleeve will be slid upwardly on the rack bar $7^b$ to carry the drag implements out of engagement with the ground and hold them suspended when the plow is turning. This modification also shows that the rack $7^b$ may be secured to and directly supported by the plow frame, if desired, instead of by a brace or bracket projecting laterally from the seat frame or bar. It is to be understood that the extensions of the sleeve $6^b$ merely rest upon the two upper arms of the lever 32, so that the sleeve will be slid upwardly on the rack $7^b$ no matter how the lever is rocked. In order to lock the latch $11^b$ out of engagement with the teeth of the rack bar $7^b$ to permit the automatic movement of the sleeve or slide through which the lever rod $3^b$ passes, the releasing handle $12^b$ of the latch is designed to be engaged by a swinging hook 35, as clearly indicated in Fig. 4.

If desired, as best seen in Fig. 8, the forward end of support for the drag implement, may be mounted in a T-shaped bracket 36, the stem 37 of which fits into a block 38, the lower end of the stem being provided with a groove designed to receive the locking key. The block 38 may be screwed on the upper end of the vertically disposed shaft or spindle 39 of the front furrow wheel, to take the place of the nut usually screwed on the upper end of said shaft. I find this a very convenient place of attachment in some types of plows, it being well known that the nut for which the block 38 is substituted is of a standard size on nearly all plows of this character. As also shown in this view, the cable arranged to raise and lower the drag implement, as above described, may be secured to arms 40 extending to the right and to the left of this block 38, since said block will have the same motion as the furrow wheel.

It is to be understood that the outwardly extending rear end 4 of the lever 3, in addition to providing means of adjustment provides for the lifting and pressing downwardly of the outside rod 17.

While I have shown the flexible connecting member for automatically raising the drag implement as a wire rope or cable, it is to be understood that the word cable will include any connection whatever.

Having thus described the invention, what is claimed as new is:

1. The combination with a plow provided with a share, of a side drag attachment therefor, comprising a vertically movable support fulcrumed on the plow, a drag implement connected to said support, and means for automatically raising said support and drag implement upon the turning of the plow to the right or to the left.

2. The combination with a plow provided with a share, of a side drag attachment therefor comprising a vertically movable support fulcrumed on the plow, means for connecting said support to the plow at different vertical adjustments, a drag implement secured to the lever and arranged to be drawn thereby at one side of the share in a plane parallel with the share, and means for holding said drag implement at different lateral distances from the plow.

3. The combination with a plow, of a vertically movable support fulcrumed thereon, a drag implement secured to and supported by the rear end of said support, and means for holding said support at different elevations and at lateral distances from the plow with the drag implement in operative relation to the ground.

4. The combination with a plow of a vertically movable support fulcrumed thereon, a drag implement supported by the rear end of said support, means for holding said drag implement and support at different elevations, and means for holding the drag implement in an operative relation to the ground at different lateral distances from the plow irrespective of the elevation.

5. The combination with a plow, of a lever fulcrumed thereon and extending rearwardly from its fulcrum, means for securing said lever to the plow at different elevations in the rear of its fulcrum, a rod fulcrumed on the plow and extending rearwardly from its fulcrum, means for coupling together the rear ends of the said lever and rod, the said coupling means being arranged to hold the rear ends of the lever and rod at different lateral distances apart, and a drag implement operatively supported by the said rod.

6. The combination with a plow, of a lever fulcrumed thereon, means for connecting said rod to the plow at different elevations in the rear of its fulcrum, a lever fulcrumed on the plow and extending rearwardly from its fulcrum, a drag implement secured to said rod, and a coupling member arranged to be secured at different lateral adjustments on the lever, and at different longitudinal adjustments on the rod.

7. The combination with a plow, of a vertically movable lever fulcrumed thereon, a drag implement supported by the rear end of said lever, a rack bar supported on the plow, a latch secured to said lever and arranged for engagement with the teeth of the rack bar, and means for automatically disengaging the latch from the rack bar and elevating the lever and drag implement upon the turning of the plow to the right or to the left.

8. The combination with a plow, of a lever fulcrumed at its front end thereon, the said lever being provided with an outwardly extending rear end, a coupling member arranged to be secured to the rear end of said lever at different lateral adjustments thereon, a rod fulcrumed at its front end on the plow and extending rearwardly, the coupling member having an adjustable connection with said last named rod, and a drag implement supported by said rod.

9. The combination with a plow, of a lever fulcrumed thereon and extending rearwardly, means for connecting the lever to the plow in the rear of its fulcrum, the said lever being provided with an outwardly extending rear end, a coupling member formed with a vertically extending series of transversely disposed openings, through any one of which the outwardly extending rear end of the lever is designed to pass, means for securing said coupling member on the rear end of the lever at different lateral adjustments, said coupling member being also formed with a longitudinally extending opening, a rod fulcrumed on the plow and extending rearwardly through the last named opening of the coupling member, and a drag implement supported by the rear end of said rod.

10. The combination with a plow of a vertically movable support fulcrumed thereon, a drag implement supported by the rear end of said support, means for holding said lever rigidly fastened to the plow, and means for automatically releasing said holding means for raising the lever and drag implement upon the turning of the plow to the right or to the left.

11. The combination with a plow of a rod 17 fulcrumed thereon and extending rearwardly, the rear end of said rod extending inwardly toward the plow and thence extending outwardly, means for connecting the rod to the plow in the rear of its fulcrum, a drag implement mounted upon the outwardly extending rear end of said rod, and a brace adapted to be secured to the extremity of said end and to another portion of the rod to hold the drag implement on the rod.

In testimony whereof I affix my signature in presence of two witnesses.

JAMES E. BURTON. [L. S.]

Witnesses:
I. W. WHEELER,
C. W. TRATT.